Aug. 4, 1953
C. H. BERNER
2,647,773
FLUID SEAL
Filed Oct. 16, 1948
2 Sheets-Sheet 1
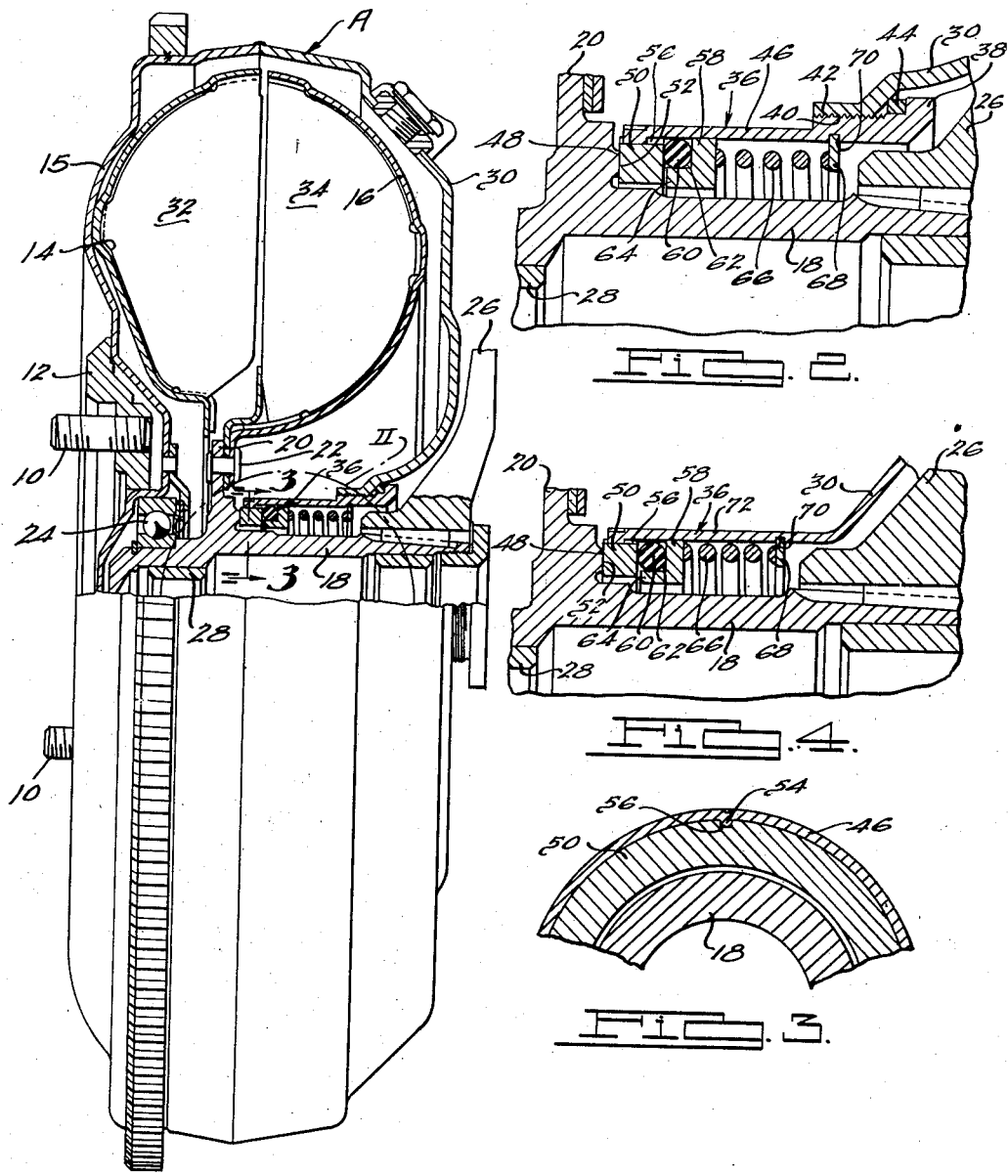
INVENTOR.
Carl H. Berner.
BY
Harness and Harris
ATTORNEYS.

Aug. 4, 1953 C. H. BERNER 2,647,773
FLUID SEAL
Filed Oct. 16, 1948 2 Sheets-Sheet 2
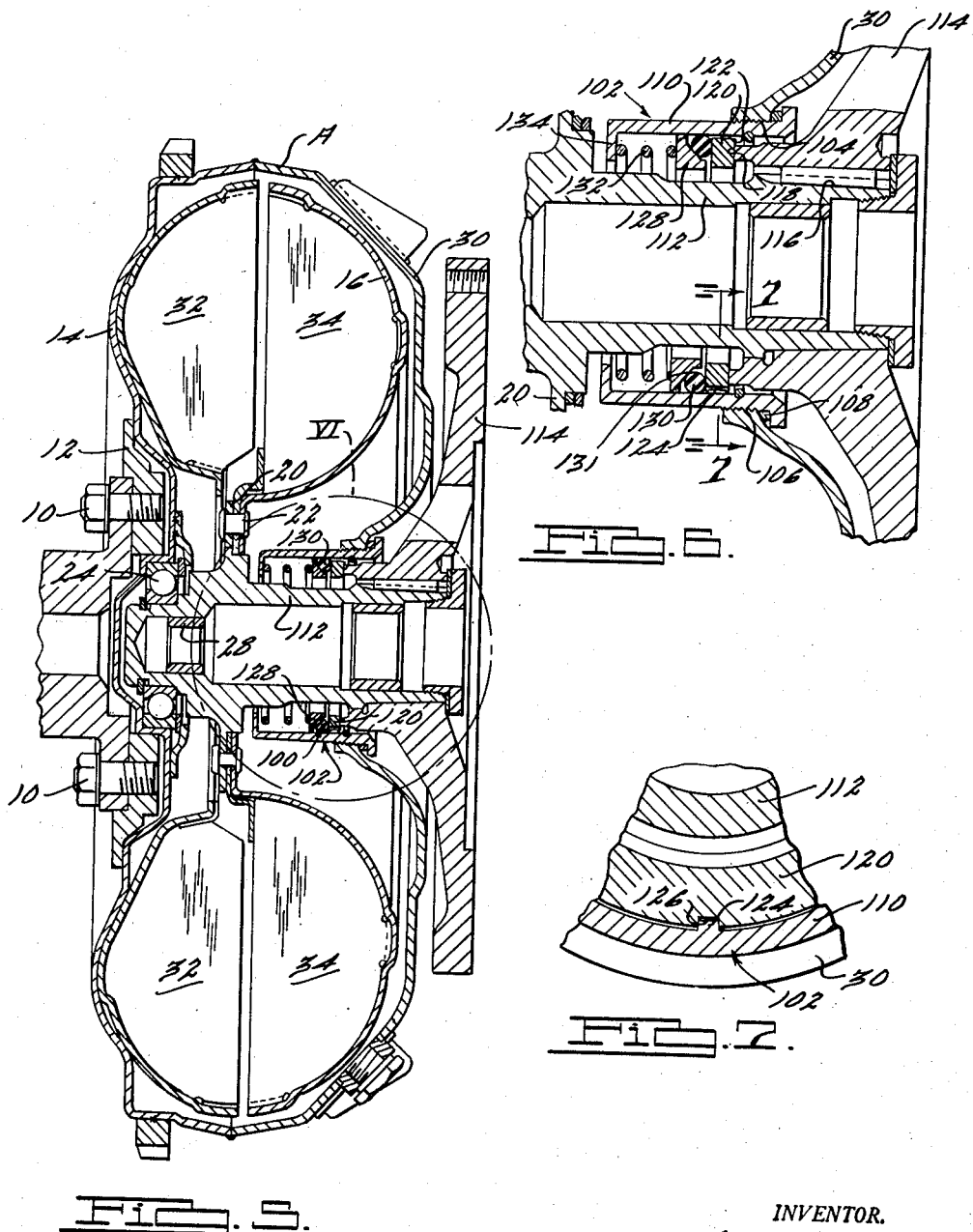
INVENTOR.
Carl H. Berner.
BY
Harness and Harris
ATTORNEYS.

Patented Aug. 4, 1953

2,647,773

UNITED STATES PATENT OFFICE 2,647,773

FLUID SEAL

Carl H. Berner, Highland Park, Mich., assignor to Chrysler Corporation, Highland Park, Mich., a corporation of Delaware Application October 16, 1948, Serial No. 54,907

1 Claim. (Cl. 286—11.14)

This invention relates to fluid seals and more particularly to an improved seal adapted to be used in conjunction with a fluid coupling.

This application is a continuation-in-part of an application, Serial No. 5,545, filed on January 31, 1948, and abandoned on October 16, 1948.

The principal object of the invention is to provide an improved seal for a housing having an opening and a shaft concentrically mounted for rotation therein relative to the housing and more particularly to provide predetermined fluid sealing characteristics and pressure blow-off characteristics in a seal having a minimum number of components which may be produced with a marked reduction in cost over seals currently employed.

U. S. Patent No. 2,264,004 which issued in 1941 to Patterson et al. illustrates a typical sealing apparatus currently used in fluid couplings for motor vehicles. It is an object of this invention to reduce the cost of such a seal by eliminating many of the components therein. For example the Sylphon bellows and silver soldered joints illustrated in Patent No. 2,264,004 are eliminated. In addition, the construction of the ring 36 illustrated in this patent is materially simplified. This ring must be provided with two perfectly machined faces to contact both the flange 18 of the coupling and the wear ring 33 of the seal. In the construction to be described herein only one face of the corresponding ring, namely the face which engages the shaft flange, must be machined with such accuracy.

It is an additional object of the invention to utilize a rubber-like substance, preferably silicon rubber, in a seal designed to operate at relatively high temperatures. Rubber-like substances have been used as sealing components in seals for refrigeration apparatus for example, but such seals are not exposed to temperatures in the range of the temperatures attained in the operation of a fluid coupling which under conditions of extreme slip may reach 400 to 500° F.

It is a further object of the invention to provide a fluid coupling seal which does not present the problem of high frequency vibration of a Sylphon bellows. Such vibration often produces an objectionable "squealing" noise. Heretofore, additional vibration dampening devices have been incorporated in the fluid coupling seal at added expense in an effort to overcome this noise.

It is an additional object of the invention to provide a fluid coupling seal having pressure relief means associated therewith to permit fluid to "blow off" when the temperature and pressure within the coupling exceed safe operating conditions.

It is a further object of the invention to so construct the related sealing components that although a rubber-like substance is used to produce a seal this substance is not required to contact a part having material rotation relative to the rubber-like substance.

Further objects and advantages of the present invention will be apparent from the following description, reference being had to the accompanying drawing, in which preferred forms of the present invention are shown:

Fig. 1 is an elevation of a fluid coupling shown partly in section and embodying one form of my invention;

Fig. 2 is an enlargement of that portion of Fig. 1 designated by the arc II;

Fig. 3 is a section of a portion of the sealing apparatus taken on the line 3—3 of Fig. 1;

Fig. 4 is a view similar to Fig. 2 but illustrating a modified form of my invention;

Fig. 5 is an elevation of a fluid coupling shown partly in section and embodying a modified seal;

Fig. 6 is an enlargement of that portion of Fig. 5 designated by the arc VI; and Fig. 7 is a section of a portion of the sealing apparatus taken on the line 7—7 of Fig. 6.

In Fig. 1 a plurality of bolts 10 are arranged in spaced circular relation and adapted to be secured to the crankshaft (not shown) of a motor vehicle. The bolts 10 are suitably threaded in a flange 12 secured as by welding to a housing 15 which carries the impeller 14 of a fluid coupling generally designated by the letter A. This end of the fluid coupling which is adapted to be secured to the engine crankshaft will herein be referred to as the forward portion of the coupling. The coupling A comprises a runner 16 carried for rotation relative to the impeller by a hollow shaft 18. The runner 16 is secured to a flange 20 of the shaft 18 by rivets 22.

Hollow shaft 18 is supported at its forward end by an anti-friction thrust bearing 24 and carries the driving element 26 of a friction clutch (not shown) at its rear end. A suitable bearing 28 is usually provided within the hollow shaft 18 to receive a driven shaft (not shown) which normally is associated with the driven portion of a clutch.

The housing 15 is provided with a rear casing portion 30 which completely encloses the runner 16. The interior of the coupling is normally filled with oil or other fluid to about 80% of its capacity and this fluid is circulated by a plurality of vanes 32 carried by the impeller 14. The runner 16 is also provided with a plurality of vanes 34. The vanes 32 and 34 provide various fluid circulating passages through which the fluid is forced when the impeller 14 is rotated by the vehicle engine thereby driving the runner in a manner well known to the art.

Due to the fact that the speeds of the impeller and runner vary because of the inherent "slip" therebetween a fluid-tight seal must be provided between the housing 30 of the impeller and the hollow shaft 18. This seal is generally designated at 36 in Fig. 1 and at 100 in Fig. 5. In the form of the invention illustrated in Fig. 2 it comprises a sleeve 38 threaded at 40 for engagement with mating threads formed in housing 30 at 42. A gasket 44 is preferably located between sleeve 38 and housing 30. The sleeve 38 has a reduced portion 46 which extends coaxially of shaft 18.

The flange 20 of the shaft 18 is provided with a flat surface 48 which is machined to close tolerances to form a sealing surface. A ring 50, preferably formed of carbon, surrounds the shaft 18 and has a surface 52 which is also flat and machined to a high degree of accuracy to form a sealing surface adapted to contact the surface 48 of flange 20 to provide a fluid seal. For reasons to be explained herein the face 52 preferably has a greater external diameter than face 48. The reduced portion 46 of the sleeve 38 is provided with a key 54 adapted to cooperate with a key way 56 provided in carbon ring 50 to prevent rotation of the carbon ring 50 with the flange 20 of shaft 18 relative to sleeve 38.

A retainer ring 58 surrounds the shaft 18 and is positioned in close proximity to the carbon ring 50. The retainer ring 58 may be provided with any one of a number of peripheral surfaces adapted to receive a ring 60 preferably having a circular cross section. The ring 60 is preferably formed of silicone rubber which is incompressible and particularly adapted to withstand high temperatures. An incompressible substance is desirable because its volume cannot be changed so that when it is deformed by the application of pressure it is forced into engagement with the internal surface of portion 46 of sleeve 38. The ring 58 has been illustrated herein as having a circumferential recess 62 provided adjacent its forward edge. The recess 62 is adapted to receive the ring 60 which thereby surrounds a portion 64 of retainer ring 58 and engages both the carbon ring 50 and the reduced portion 46 of the sleeve 38 to provide fluid seals at these points. The ring 60 must be so dimensioned that its overall diameter is sufficient to engage the internal surface of the reduced portion 46 of sleeve 38 with a radially directed force. In addition the diameter of a section thereof is sufficiently great to prevent retainer ring 58 from engaging carbon ring 50 so that the seal preventing the escape of fluid from between the carbon ring 50 and retainer ring 58 is produced by the engagement of these rings with the ring 60. The rings 50 and 58 preferably have external diameters sufficiently large to come in close contact with the internal surface of sleeve 38 to prevent extrusion of rubber therebetween if the silicone rubber tends to flow at extremely high temperatures. For the same reason portion 64 of ring 58 is extended forward to come in close proximity with ring 50. A coil spring 66 (Fig. 2) bears against the rear or right hand (in Fig. 2) surface of the retainer ring 58 and against a thrust washer 68 located in a groove 70 provided in the sleeve 38. The spring 66 functions to force the retainer ring 58 against the ring 60 which in turn is forced against the carbon ring 50 thereby causing surfaces 48 and 52 to be engaged with sufficient pressure to prevent leakage of fluid and to provide a seal between the ring 60 and each of the other rings. The fact that ring 60 is incompressible assures that the pressure exerted by spring 66 will remain constant even after continued usage. If ring 60 were formed of a compressible material, such as felt, it would reduce in volume after usage and this would further extend spring 66 and change the spring rate thereof.

During periods of vehicle acceleration and at other times when the speeds of the impeller and runner vary considerably, the temperature of the fluid rises and under conditions of extreme slip may reach 400° to 500° F. The pressure of the trapped air in the coupling rises correspondingly. It is therefore necessary for the seal 36 to be of such construction that it provides a safety-blow-off for the escape of fluid when the temperature and pressure of the fluid and air within the coupling exceed safe operating conditions. The seal illustrated in Fig. 2 is adapted to permit the escape of fluid when the pressure within the coupling reaches a predetermined value. When the pressure is sufficiently high within the coupling the fluid acts against face 52 of the carbon ring 50 to move the carbon ring 50, the ring 60 and the retainer ring 58 to the rear or right in Fig. 2 by overcoming spring 66. This produces a space between surfaces 48 and 52 which is sufficiently large to permit fluid to pass therethrough and travel between the shaft 18 and the collar 38 to escape from the coupling.

In Fig. 4 a modified form of the invention is illustrated. In this form of the invention the separate sleeve 38 is eliminated and the housing 30 of the impeller is provided with an integral sleeve portion 72 which is formed therein preferably by a deep drawing process. The sleeve portion 72 of the housing 30 is provided with the key 54 formerly described as being located on the extended portion 46 of sleeve 38. In other respects the sealing apparatus illustrated in Fig. 4 is similar to that illustrated in Fig. 2 and for purposes of brevity the parts will not be again described and the numerals used in Fig. 2 to designate the parts have been applied to the corresponding components in Fig. 4. The sleeve portion 72 of housing 30 serves the same functional purpose as that provided by the extended portion 46 of sleeve 38 and is provided with the groove 70 previously referred to as receiving the thrust collar 68. If desired, either the collar 38 of Fig. 2 or the sleeve portion 72 of Fig. 4 may be provided with an internal diameter sufficiently small to come in close proximity to spring 66. This serves to prevent vibration of spring 66 and thereby eliminates a source of noise or squeal. The sleeve portion 72 of Fig. 4 has been illustrated as being constructed in this manner.

A modified form of the invention is illustrated in Figs. 5, 6 and 7. In view of the fact that the modification relates to the seal and that the other fluid coupling components are substantially identical to those illustrated and described with reference to Fig. 1 the description of the coupling will not be duplicated. It should further be recognized that the form of the invention illustrated in Fig. 6 may be associated with a housing having a separate sleeve as illustrated in Figs. 2 and 6 or it may be associated with a housing provided with an integral sleeve portion which is formed therein by a deep drawing process and illustrated in Fig. 4.

Referring to Figs. 5 and 6 it will be seen that a sleeve 102 is threaded at 104 for engagement with mating threads formed in housing 30 at 106. A gasket 108 is preferably located between sleeve 102 and housing 30. The sleeve has a portion 110 which extends coaxially of a shaft 112 which corresponds to the shaft 18 of Figs. 1 through 4. The hollow shaft 112 carries the driving element 114 of a friction clutch. The driving element 114 is keyed to the shaft 112 at 116 and provided with a flat surface 118 which is machined to close tolerances to form a sealing surface. The surface 118 faces in a direction opposite to the direction in which fluid would normally flow through the sleeve 102. A ring 120, preferably formed of carbon, surrounds the shaft 112 and has a surface 122 which is also flat and machined to a high degree of accuracy to form a sealing surface adapted to contact the surface 118 to provide a fluid seal. The sleeve 102 is provided with a key 124 adapted to cooperate with a keyway 126 provided in carbon ring 120 to prevent rotation of the carbon ring 120 relative to sleeve 102.

A retainer ring 128 surrounds the shaft 112 and is positioned in close proximity to the carbon ring 120. The retainer ring 128 may be provided with any one of a number of surfaces adapted to receive a ring 130 having a circular cross section. The ring 128 is illustrated in Figs. 5 and 6 as provided with a sloping surface 131. A ring 130 corresponding to the ring 60 of Figs. 1, 2 and 4 is provided and preferably formed of silicone rubber. The ring 130 engages both the carbon ring 120 and the portion 110 of sleeve 102 to provide fluid seals at these points. The ring 130, like ring 60, must be so dimensioned that its overall diameter is sufficiently large to engage the internal surface of sleeve 102 with radially directed forces. In addition, the diameter of a section thereof is sufficiently great to prevent retainer ring 128 from engaging carbon ring 120 as was explained with reference to ring 60. The rings 120 and 128, like rings 50 and 58, preferably have external diameters sufficiently large to come in close contact with the internal surface of sleeve 102 to prevent extrusion of the rubber therebetween. A coil spring 132 bears against the forward or left hand (in Fig. 6) surface of the retainer ring 128 and against a flange 134 formed at the forward end (left end in Fig. 6) of sleeve 102. The spring 132 corresponds to the spring 66 of Fig. 2 and functions to force the retainer ring 128 against the ring 130 which in turn is forced against the carbon ring 120 thereby causing surfaces 118 and 122 to be engaged with sufficient pressure to prevent leakage of fluid and to provide a seal between the ring 130 and ring 120.

In certain applications such as providing a seal for the shaft of a refrigerant compressor it is desirable to have any pressure generated within the housing tend to increase the effectiveness of the seal. The form of the invention illustrated in Figs. 5 and 6 is particularly adapted to accomplish this purpose. In addition, the assembly of the seal illustrated in Figs. 5 and 6 is facilitated by the location of the seal which is near the entrant portion of sleeve 102.

I claim:

Apparatus for sealing fluid within a fluid coupling housing having a tubular wall portion defining an opening and a rotary shaft extending therethrough and provided with a radially extending sealing surface, said apparatus comprising a carbon ring circumscribing said shaft and provided with a peripheral portion abutting the inner surface of said tubular portion, said carbon ring having a sealing surface abutting the sealing surface provided on said shaft and a radially extending second surface located on the side of said carbon ring remote from said sealing surface, mechanical locking means operable to prevent rotation of said carbon ring relative to said housing, a retaining ring circumscribing said shaft and provided with a recess in the forward edge thereof and a peripheral portion abutting the inner surface of said tubular portion, a deformable and incompressible rubber-like third ring having a circular cross section located in said recess and a spring circumscribing said shaft, reacting against said housing and urging said retaining ring against said third ring, said third ring against said carbon ring and the sealing surface of said carbon ring against the sealing surface of said shaft, said retaining ring having a second portion engaging the internal periphery of said third ring and extending into close proximity to the second surface of said carbon ring so that the tubular wall of the housing, the retaining ring and the carbon ring cooperate to substantially completely confine said third ring and retain said third ring against flow thereof between said retaining ring and said tubular wall portion and between said second portion of said retaining ring and said carbon ring when high temperatures and fluid pressures are applied to the third ring during operation of the fluid coupling and the high temperature softens the third ring.

CARL H. BERNER.

References Cited in the file of this patent

UNITED STATES PATENTS

| Number | Name | Date |
|---|---|---|
| 1,342,131 | Mycock | June 1, 1920 |
| 1,528,334 | Hurd | Mar. 3, 1925 |
| 2,215,034 | Gorman | Sept. 17, 1940 |
| 2,408,314 | Jacobsen | Sept. 24, 1946 |
| 2,503,086 | Albright | Apr. 4, 1950 |

FOREIGN PATENTS

| Number | Country | Date |
|---|---|---|
| 8,816 | Great Britain | of 1906 |
| 266,479 | Great Britain | of 1927 |
| 379,210 | Great Britain | of 1932 |
| 461,446 | Germany | of 1928 |
| 461,861 | Great Britain | of 1937 |